United States Patent
Nam et al.

(10) Patent No.: US 11,343,804 B2
(45) Date of Patent: May 24, 2022

(54) PHASE-TRACKING REFERENCE SIGNAL MAPPING

(71) Applicant: QUALCOMM Incorporated, San Diego, CA (US)

(72) Inventors: Wooseok Nam, San Diego, CA (US); Alexandros Manolakos, San Diego, CA (US); Tao Luo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/267,796

(22) Filed: Feb. 5, 2019

(65) Prior Publication Data
US 2019/0254020 A1    Aug. 15, 2019

(30) Foreign Application Priority Data

Feb. 14, 2018   (GR) .............................. 20180100054

(51) Int. Cl.
*H04W 72/04* (2009.01)
*H04L 5/00* (2006.01)

(52) U.S. Cl.
CPC ....... *H04W 72/0413* (2013.01); *H04L 5/0048* (2013.01); *H04L 5/0051* (2013.01)

(58) Field of Classification Search
CPC . H04W 72/0413; H04L 5/0051; H04L 5/0048
See application file for complete search history.

(56) References Cited

U.S. PATENT DOCUMENTS

| | | | | |
|---|---|---|---|---|
| 2007/0002823 A1* | 1/2007 | Skov Andersen | .... | H04J 3/0605 370/349 |
| 2009/0285193 A1* | 11/2009 | Kim | ...................... | H04W 72/04 370/342 |
| 2010/0027544 A1* | 2/2010 | Li | .......................... | H04L 45/00 370/392 |
| 2012/0195271 A1* | 8/2012 | Lee | ...................... | H04L 5/0053 370/329 |

(Continued)

OTHER PUBLICATIONS

International Search Report and Written Opinion—PCT/US2019/016789—ISA/EPO—dated May 16, 2019.

(Continued)

*Primary Examiner* — Gregory B Sefcheck
*Assistant Examiner* — Joshua Smith
(74) *Attorney, Agent, or Firm* — Harrity & Harrity, LLP

(57) ABSTRACT

Various aspects of the present disclosure generally relate to wireless communication. In some aspects, a wireless communication device may determine that a phase-tracking reference signal (PTRS) will not be transmitted based at least in part on a mapping value associated with transmitting the PTRS, and may identify another mapping value associated with transmitting the PTRS, wherein the other mapping value is different from the mapping value. In some aspects, a wireless communication device may identify a symbol in which a demodulation reference signal (DMRS) is to be muted, and may map, based at least in part on a mapping value configured on the wireless communication device, a PTRS relative to the symbol in which the DMRS is to be muted. Numerous other aspects are provided.

31 Claims, 8 Drawing Sheets

(56) References Cited

U.S. PATENT DOCUMENTS

| | | | |
|---|---|---|---|
| 2014/0269873 A1* | 9/2014 | Tahir | H04W 52/241 375/227 |
| 2015/0098369 A1* | 4/2015 | Song | H04L 5/005 370/280 |
| 2016/0080052 A1* | 3/2016 | Li | H04L 5/005 375/267 |
| 2016/0277165 A1* | 9/2016 | Wei | H04L 27/0006 |
| 2016/0330011 A1* | 11/2016 | Lee | H04L 5/0066 |
| 2017/0150499 A1* | 5/2017 | Kim | H04L 27/2613 |
| 2017/0201968 A1* | 7/2017 | Nam | H04W 72/042 |
| 2017/0264402 A1* | 9/2017 | Papasakellariou | H04W 52/58 |
| 2017/0272299 A1* | 9/2017 | Chae | H04W 76/14 |
| 2018/0124796 A1* | 5/2018 | Noh | H04W 28/04 |
| 2018/0131492 A1* | 5/2018 | Wilson | H04L 5/0023 |
| 2018/0262295 A1* | 9/2018 | Oketani | H04L 27/2602 |
| 2018/0359071 A1* | 12/2018 | Lee | H04L 1/00 |
| 2019/0036746 A1* | 1/2019 | Hwang | H04L 27/3444 |
| 2019/0081844 A1* | 3/2019 | Lee | H04J 13/0062 |
| 2019/0327762 A1* | 10/2019 | Takeda | H04W 72/0406 |
| 2019/0364438 A1* | 11/2019 | Yang | H04L 27/26 |
| 2019/0372678 A1* | 12/2019 | Han | H04W 4/80 |
| 2019/0380124 A1* | 12/2019 | Kim | H04L 5/0048 |
| 2020/0228384 A1* | 7/2020 | Saito | H04W 72/04 |

OTHER PUBLICATIONS

NTT DOCOMO., et al., "Remaining Details on PT-RS", 3GPP TSG RAN WG1 Meeting #90bis , 3GPP Draft, R1-1718199_Remaining Details on PT-RS, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341381, 12 Pages, Retrieved from the Internet: URL: http://www.3gpp.org/ftp/Meetings_3GPP_SYNC/RAN1/Docs/ [retrieved on Oct. 8, 2017] Sections 2.5, 2.7.

VIVO: "Remaining Details on DMRS Design", 3GPP TSG RAN WG1 NR Ad Hoc #3, 3GPP Draft R1-1715623_Remaining Details on DMRS Design, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017, Sep. 17, 2017 (Sep. 17, 2017), 10 Pages, XP051339090, Retrieved from the Internet: URL: http://www.3gpp.org/ftp/Meetings_3GPP_SYNC/RAN1/Docs/ [retrieved on Sep. 17, 2017] Section 2.1.4.

* cited by examiner

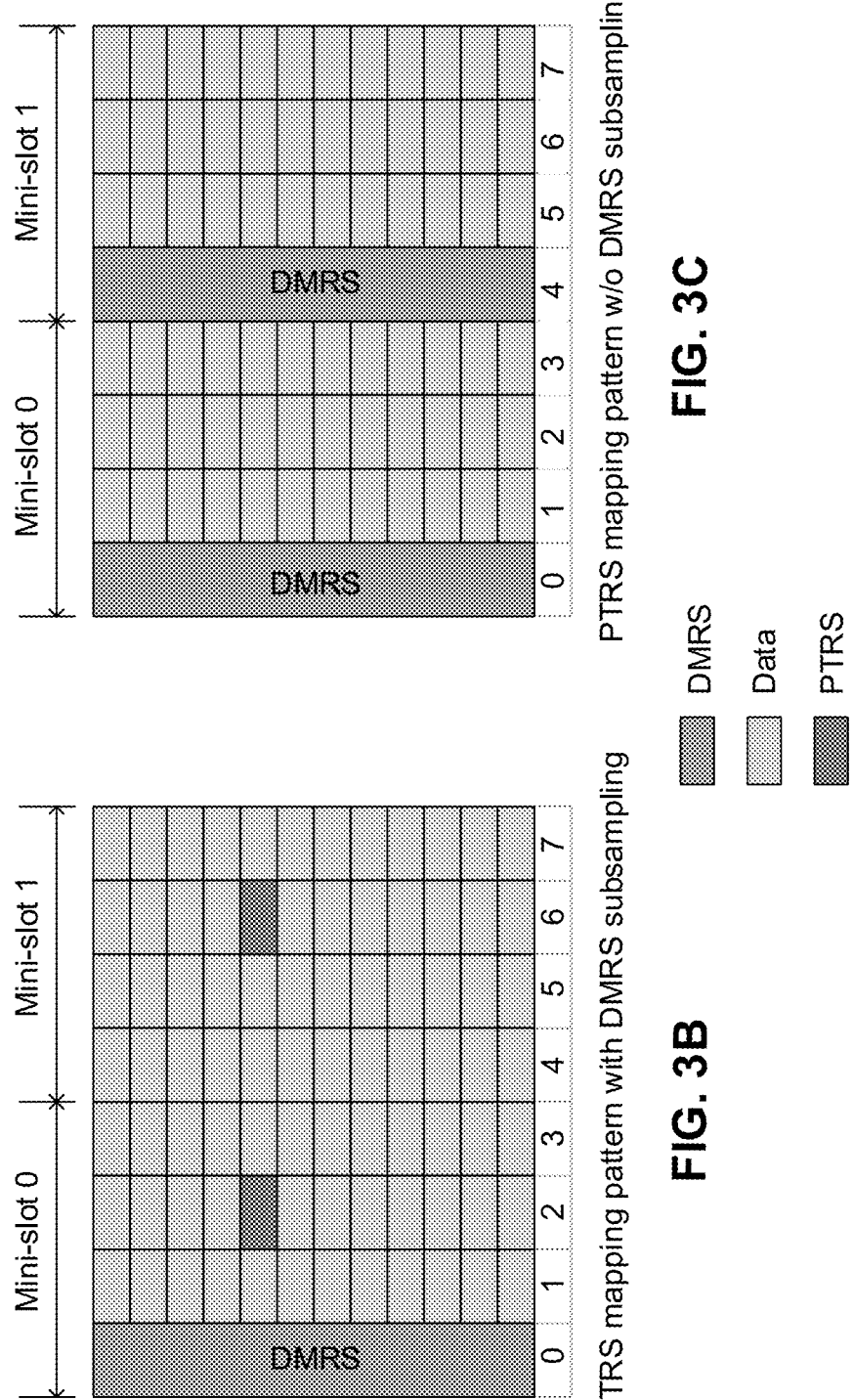

PHASE-TRACKING REFERENCE SIGNAL MAPPING

CROSS-REFERENCE TO RELATED APPLICATION

This application claims priority to Greece Patent Application No. 20180100054, filed on Feb. 14, 2018, entitled "TECHNIQUES AND APPARATUSES FOR PHASE-TRACKING REFERENCE SIGNAL MAPPING IN NEW RADIO," which is hereby expressly incorporated by reference herein.

INTRODUCTION

Aspects of the present disclosure generally relate to wireless communication, and more particularly to phase-tracking reference signal (PTRS) mapping.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a wireless communication device may include determining that a phase-tracking reference signal (PTRS) will not be transmitted based at least in part on a mapping value associated with transmitting the PTRS; and identifying, based at least in part on determining that the PTRS will not be transmitted based at least in part on the mapping value, another mapping value associated with transmitting the PTRS, wherein the other mapping value is different from the mapping value.

In some aspects, a wireless communication device for wireless communication may include memory and one or more processors coupled to the memory. The memory and the one or more processors may be configured to determine that a PTRS will not be transmitted based at least in part on a mapping value associated with transmitting the PTRS; and identify, based at least in part on determining that the PTRS will not be transmitted based at least in part on the mapping value, another mapping value associated with transmitting the PTRS, wherein the other mapping value is different from the mapping value.

In some aspects, a non-transitory computer-readable medium may store one or more instructions for wireless communication. The one or more instructions, when executed by one or more processors of a wireless communication device, may cause the one or more processors to determine that a PTRS will not be transmitted based at least in part on a mapping value associated with transmitting the PTRS; and identify, based at least in part on determining that the PTRS will not be transmitted based at least in part on the mapping value, another mapping value associated with transmitting the PTRS, wherein the other mapping value is different from the mapping value.

In some aspects, an apparatus for wireless communication may include means for determining that a PTRS will not be transmitted based at least in part on a mapping value associated with transmitting the PTRS; and means for identifying, based at least in part on determining that the PTRS will not be transmitted based at least in part on the mapping value, another mapping value associated with transmitting the PTRS, wherein the other mapping value is different from the mapping value.

In some aspects, a method of wireless communication performed by a wireless communication device may include identifying a symbol in which a demodulation reference signal (DMRS) is to be muted; and mapping, based at least in part on a mapping value configured on the wireless communication device, a PTRS relative to the symbol in which the DMRS is to be muted.

In some aspects, a wireless communication device for wireless communication may include memory and one or more processors coupled to the memory. The memory and the one or more processors may be configured to identify a symbol in which a DMRS is to be muted; and map, based at least in part on a mapping value configured on the wireless communication device, a PTRS relative to the symbol in which the DMRS is to be muted.

In some aspects, a non-transitory computer-readable medium may store one or more instructions for wireless communication. The one or more instructions, when executed by one or more processors of a wireless communication device, may cause the one or more processors to identify a symbol in which a DMRS is to be muted; and map, based at least in part on a mapping value configured on the wireless communication device, a PTRS relative to the symbol in which the DMRS is to be muted.

In some aspects, an apparatus for wireless communication may include means for identifying a symbol in which a DMRS is to be muted; and means for mapping, based at least in part on a mapping value configured on the apparatus, a PTRS relative to the symbol in which the DMRS is to be muted.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating an example of identifying, based at least in part on determining that a PTRS will not be transmitted based at least in part on a mapping value, another mapping value associated with transmitting the PTRS, in accordance with various aspects of the present disclosure.

DETAILED DESCRIPTION

Figure 1:
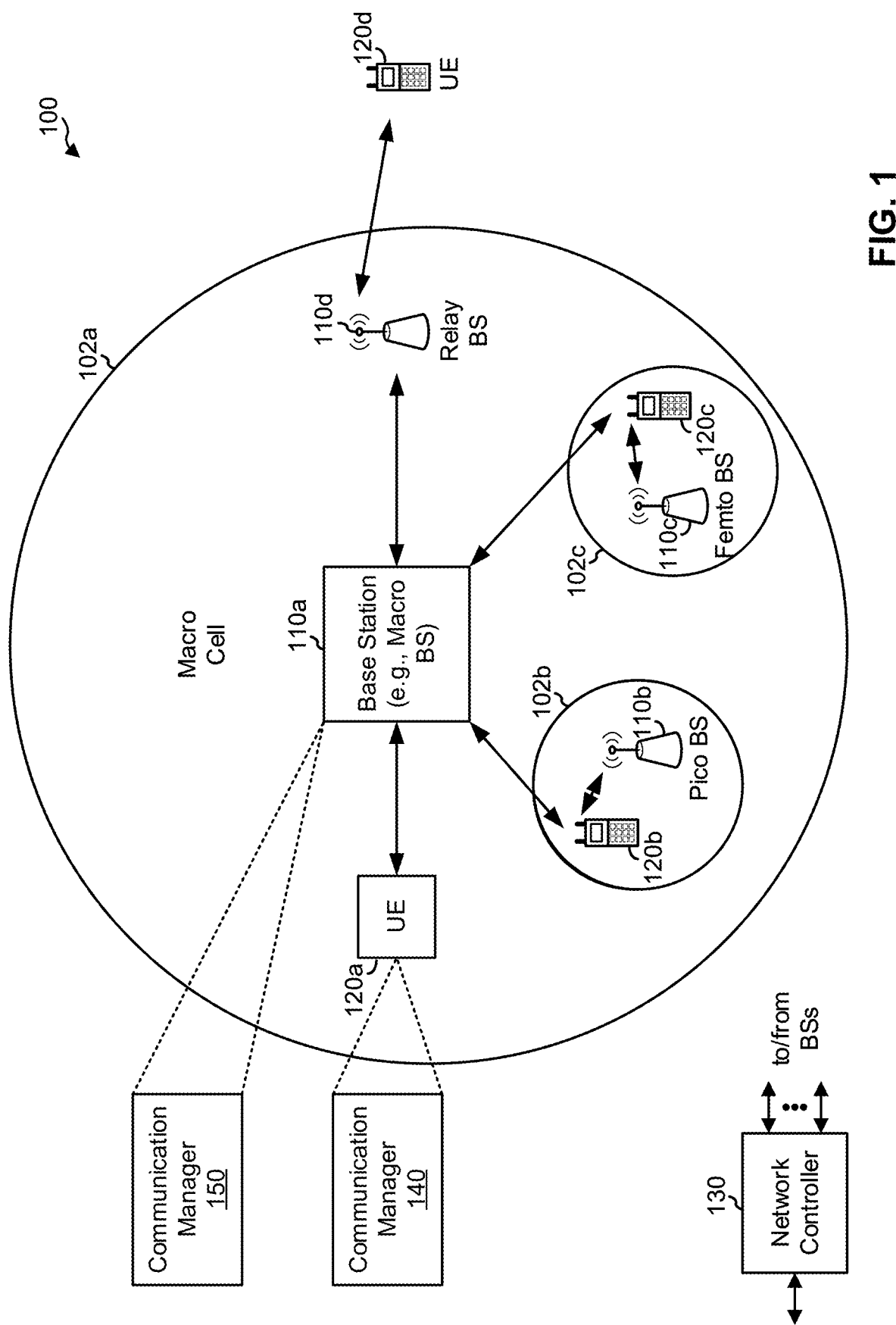
FIG. 1 is a block diagram conceptually illustrating an example of a wireless communication network, in accordance with various aspects of the present disclosure.

A phase-tracking reference signal (PTRS) is a reference signal that may facilitate compensation of phase noise in a wireless communication network, such as an NR network. The PTRS can be semi-statically configured on a wireless communication device and the wireless communication device may map the PTRS to one or more resources of the slot based on the set of association tables and a set of PTRS mapping rules configured on the wireless communication device. However, configuration and/or mapping of the PTRS becomes complex in dynamic scenarios, and the typical semi-static configuration of a single mapping value and use of the typical PTRS mapping rules may be insufficient in order to ensure acceptable phase noise compensation based on the PTRS. An example of such a scenario is when slot aggregation can be dynamically enabled or disabled (with or without DMRS subsampling).

Some aspects described herein provide techniques and apparatuses for PTRS mapping in a dynamic scenario in order to facilitate phase noise compensation, thereby improving performance in a wireless communication network. In some aspects, the PTRS mapping may be performed based at least in part on determining that the PTRS will not be transmitted based at least in part on a first mapping value, and identifying another mapping value associated with transmitting the PTRS, as described below. Additionally, or alternatively, the PTRS mapping may be performed by mapping the PTRS relative to a symbol in which a DMRS is to be muted, as described below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may determine that a PTRS will not be transmitted based at least in part on a mapping value associated with transmitting the PTRS; and may identify, based at least in part on determining that the PTRS will not be transmitted based at least in part on the mapping value, another mapping value associated with transmitting the PTRS, wherein the other mapping value is different from the mapping value. Additionally, or alternatively, as described in more detail elsewhere herein, the communication manager 140 may identify a symbol in which a DMRS is to be muted, and may map, based at least in part on a mapping value configured on the UE 120, a PTRS relative to the symbol in which the DMRS is to be muted. Additionally, or alternatively, the communication manager 140 may perform one or more other operations described herein.

Similarly, the base station 110 may include a communication manager 150. As described in more detail elsewhere herein, the communication manager 150 may determine that a PTRS will not be transmitted based at least in part on a mapping value associated with transmitting the PTRS; and may identify, based at least in part on determining that the PTRS will not be transmitted based at least in part on the mapping value, another mapping value associated with transmitting the PTRS, wherein the other mapping value is different from the mapping value. Additionally, or alternatively, as described in more detail elsewhere herein, the communication manager 150 may identify a symbol in which a DMRS is to be muted, and may map, based at least in part on a mapping value configured on the base station 110, a PTRS relative to the symbol in which the DMRS is to be muted. Additionally, or alternatively, the communication manager 150 may perform one or more other operations described herein.

As indicated above, FIG. 1 is provided merely as an example. Other examples may differ from what is described with regard to FIG. 1.

Figure 2:
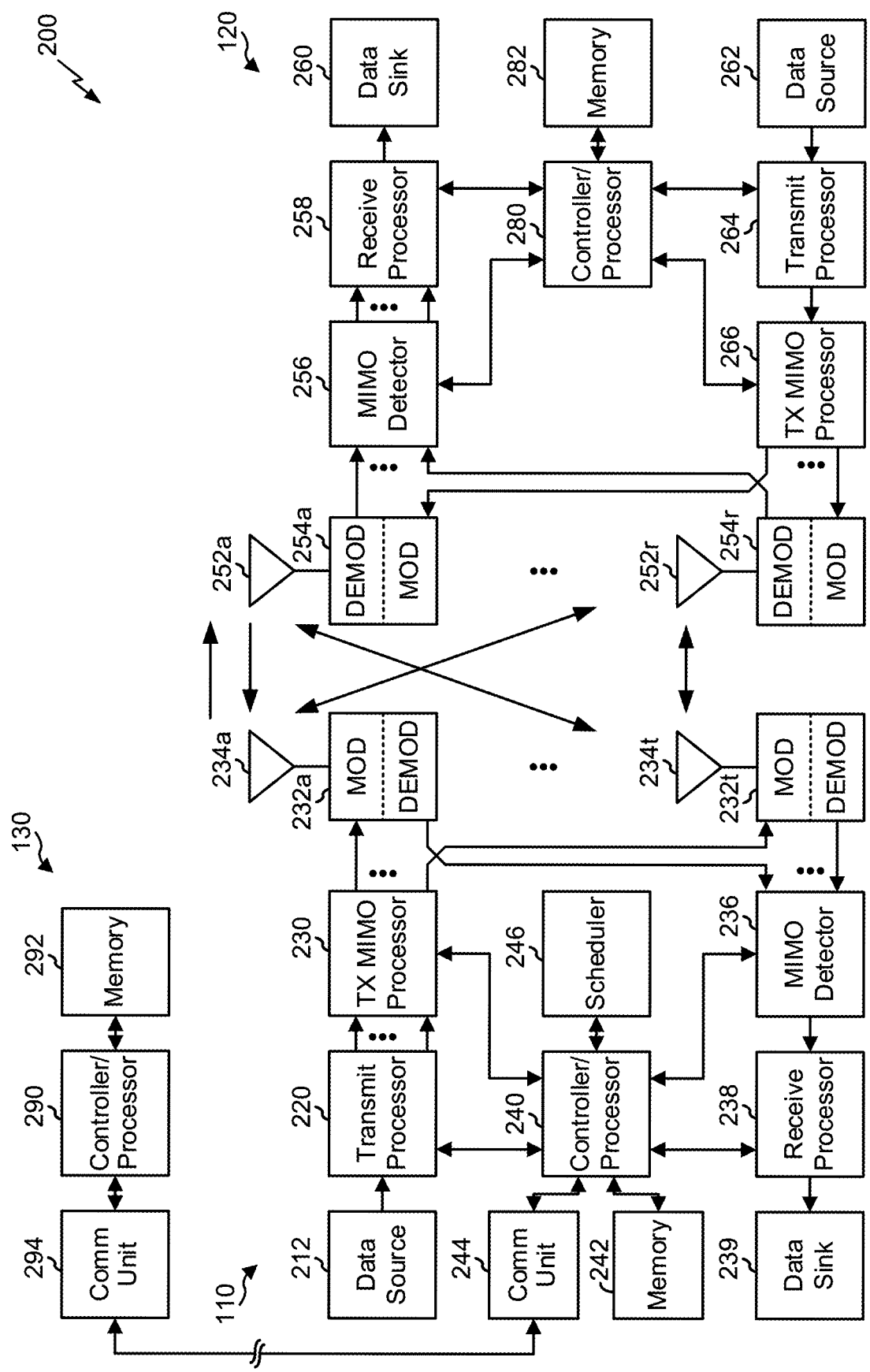
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with PTRS mapping in NR, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for determining that a PTRS will not be transmitted based at least in part on a mapping value associated with transmitting the PTRS; means for identifying, based at least in part on determining that the PTRS will not be transmitted based at least in part on the mapping value, another mapping value associated with transmitting the PTRS, wherein the other mapping value is different from the mapping value; and/or the like. Additionally, or alternatively, the UE 120 may include means for identifying a symbol in which a DMRS is to be muted; means for mapping, based at least in part on a mapping value configured on the UE 120, a PTRS relative to the symbol in which the DMRS is to be muted; and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for determining that a PTRS will not be transmitted based at least in part on a mapping value associated with transmitting the PTRS; means for identifying, based at least in part on determining that the PTRS will not be transmitted based at least in part on the mapping value, another mapping value associated with transmitting the PTRS, wherein the other mapping value is different from the mapping value; and/or the like. Additionally, or alternatively, the base station 110 may include means for identifying a symbol in which a DMRS is to be muted; means for mapping, based at least in part on a mapping value configured on the base station 110, a PTRS relative to the symbol in which the DMRS is to be muted; and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

While some techniques are described herein in connection with frames, subframes, slots, and/or the like, these techniques may equally apply to other types of wireless communication structures, which may be referred to using terms other than "frame," "subframe," "slot," and/or the like in NR. In some aspects, a wireless communication structure may refer to a periodic time-bounded communication unit defined by a wireless communication standard and/or protocol.

New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In a wireless communication network, phase noise increases as oscillator carrier frequency increases. Thus, when relatively high frequencies are used for wireless communications (e.g., such as mmW frequencies used in an NR network), compensation for this increased phase noise may be needed in order to achieve an acceptable level of performance. A phase-tracking reference signal (PTRS) is a reference signal that may facilitate compensation for phase noise in a wireless communication network, such as an NR network.

The PTRS can be semi-statically configured on a wireless communication device. For example, the wireless communication device may be semi-statically configured with a set of PTRS association tables (e.g., a table associating a time density of the PTRS with an MCS associated with a slot, a table associating a frequency density of the PTRS with a bandwidth associated with the given slot, and/or the like). Here, the wireless communication device receives (e.g., via radio resource control (RRC) signaling) an indication of whether the PTRS is to be present in the slot and, when the PTRS is to be present, the wireless communication device maps the PTRS to one or more resources of the slot based on the set of association tables (e.g., based on a table associating density of the PTRS in the time domain with an MCS associated with the slot, based on a table associating density of the PTRS in the frequency domain with a bandwidth associated with the slot, and/or the like) and a set of PTRS mapping rules configured on the wireless communication device.

Typically, the PTRS mapping rules dictate that PTRS mapping in the time domain is to start at a first symbol of the slot (e.g., a first physical downlink shared channel (PDSCH) symbol of a slot, a first physical uplink shared channel (PUSCH) symbol of a slot, and/or the like), and that the PTRS is to be repeated based on a mapping value (L) (e.g., such that the PTRS is repeated every L (L≥1) symbols). Here, the mapping value defines the density of PTRS tones within the slot (in the time domain). Further, the PTRS mapping rules typically dictate that PTRS mapping is restarted at each symbol carrying a demodulation reference signal (DMRS), and that the PTRS is not to be transmitted in any DMRS symbol (e.g., on the uplink or on the downlink).

However, configuration and/or mapping of the PTRS becomes complex in dynamic scenarios, and the typical semi-static configuration of a single mapping value and use of the typical PTRS mapping rules may be insufficient to ensure acceptable phase noise compensation based on the PTRS. An example of such a scenario is when slot aggregation can be dynamically enabled or disabled (with or without DMRS subsampling).

Generally, slot aggregation allows two or more slots (e.g., two or more mini-slots) to be scheduled for a single transmission. In some cases, an aggregation level (e.g., a number of slots and/or mini-slots to be aggregated to create a given aggregated slot) is semi-statically configured on the wireless communication device (e.g., via RRC signaling), and slot aggregation can be dynamically enabled or disabled (e.g., via DCI). Within a given aggregated slot, DMRS bundling may be supported (which allows phase continuity over the aggregated slots to be assumed), and a per-slot DMRS pattern may be maintained. Further, in some cases, DMRS subsampling (sometimes referred to as DMRS muting) may be supported, whereby one or more DMRS symbols are muted so that data can be transmitted on the one or more symbols (e.g., in order to reduce DMRS overhead).

Here, since slot aggregation can be dynamically enabled or disabled, a semi-statically configured mapping value, associated with mapping the PTRS according to a typical set of PTRS mapping rules, may prevent the PTRS from being transmitted for an undesirable length of time. For example, assume that a semi-statically configured mapping value (e.g., L=4) is greater than or equal to a number of symbol periods from a first DMRS symbol to a second DMRS symbol in an aggregated slot (e.g., 4 symbol periods). Further, assume that the set of PTRS mapping rules dictate that the PTRS is not to be transmitted in any DMRS symbol. Here, if DMRS subsampling is activated (e.g., such that one or more DMRS symbols in the aggregated slot are muted) no PTRS will be transmitted within the aggregated slot (e.g., since every fourth symbol is still considered a DMRS symbol, despite being muted), thereby degrading performance. Performance may be degraded even in a case where DMRS subsampling is not activated, if the DMRS is not or cannot be used for phase noise compensation. Notably, in a case where both the configuration of the mapping value and activation of slot aggregation is semi-static (i.e., not dynamic), then the mapping value may be configured to avoid the situation that PTRS is not transmitted for an undesirable length of time.

Some aspects described herein provide techniques and apparatuses for PTRS mapping in a dynamic scenario in order to facilitate phase noise compensation, thereby improving performance in a wireless communication network. In some aspects, the PTRS mapping may be performed based at least in part on determining that the PTRS will not be transmitted based at least in part on a first mapping value, and identifying another mapping value associated with transmitting the PTRS, as described below. Additionally, or alternatively, the PTRS mapping may be performed by mapping the PTRS relative to a symbol in which a DMRS is to be muted, as described below.

Figure 3A:
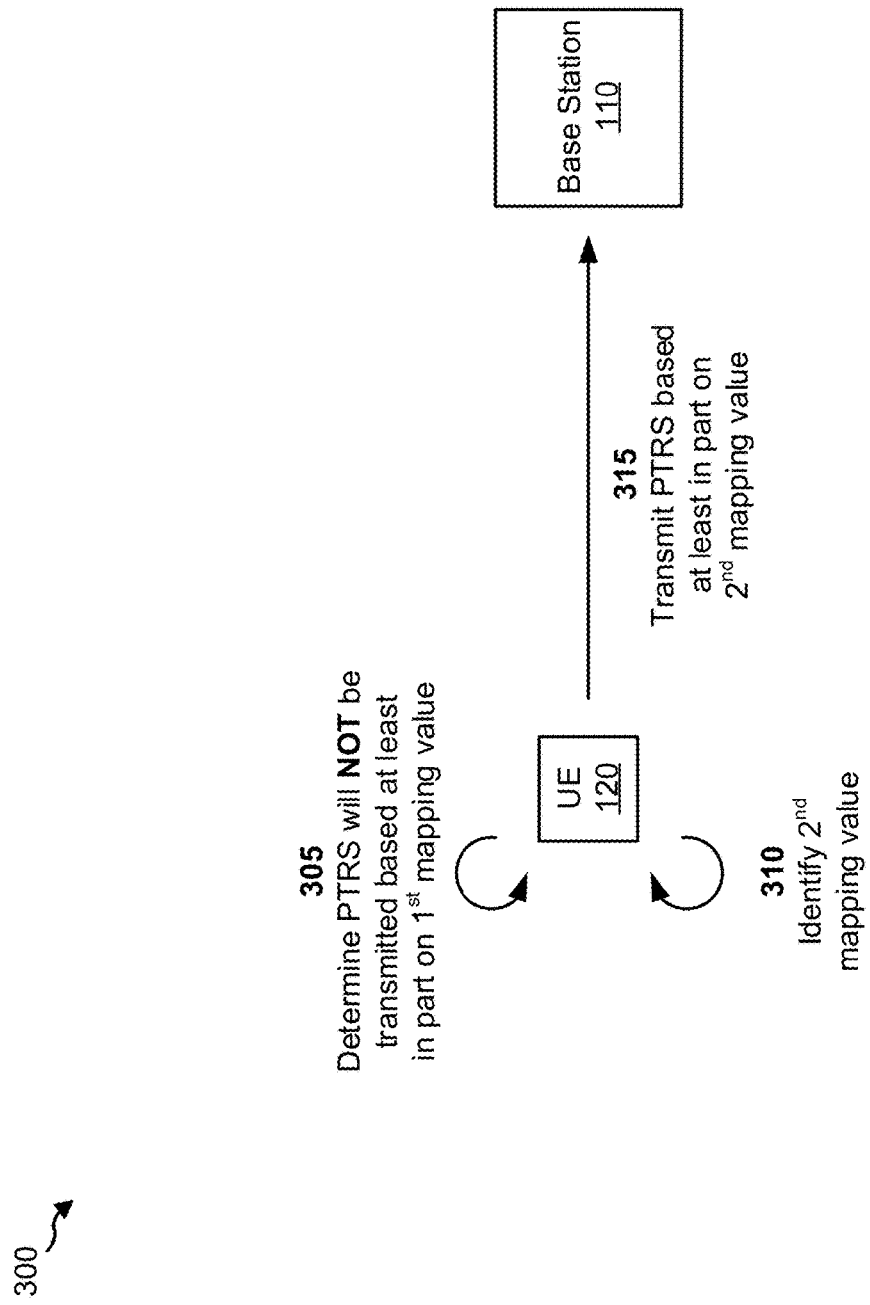

FIGS. 3A-3C are diagrams illustrating an example 300 of identifying, based at least in part on determining that the PTRS will not be transmitted based at least in part on a mapping value, another mapping value associated with transmitting the PTRS, in accordance with various aspects of the present disclosure. Notably, while example operations associated with FIGS. 3A-3C are illustrated as being performed by a UE 120, the example operations associated with FIGS. 3A-3C can be performed by another type of wireless communication device that is to transmit a PTRS, such as a base station 110.

As shown in FIG. 3A, and by reference number 305, a wireless communication device (e.g., UE 120) may determine that a PTRS will not be transmitted based at least in part on a first mapping value associated with transmitting the PTRS.

In some aspects, the wireless communication device may determine that the PTRS will not be transmitted based at least in part on the first mapping value, based at least in part on identifying a dynamic scenario, such as a scenario in which an aggregated slot is to be created in association with a dynamic slot aggregation. For example, the wireless communication device may determine (e.g., based at least in part on DCI) that the slot aggregation has been dynamically enabled, and may identify (e.g., based at least in part on a semi-static slot aggregation configuration of the wireless communication device) a number of symbol periods from a first DMRS symbol to a second DMRS symbol in the aggregated slot. Here, the wireless communication device may compare a first mapping value, associated with transmitting the PTRS (e.g., a mapping value that is semi-statically configured on the wireless communication device via RRC signaling), to the number of symbol periods from the first DMRS symbol to the second DMRS symbol, and may determine that the PTRS will not be transmitted based at least in part on the first mapping value based at least in part on the comparison (e.g., when the first mapping value meets or exceeds the number of symbol periods from the first DMRS symbol to the second DMRS symbol). As a particular example, when the first mapping value L is equal to 4 and there are 4 symbol periods from a first DMRS symbol to a second DMRS symbol, the wireless communication device may determine that the PTRS will not be transmitted based at least in part on the first mapping value (e.g., when the PTRS is not to be transmitted in a DMRS symbol).

In some aspects, the determination that the PTRS will not be transmitted based at least in part on the first mapping value may take into account a determination of whether DMRS subsampling is activated in the aggregated slot. For example, when the first mapping value L is equal to 4, there are 4 symbol periods from a first DMRS symbol to a second DMRS symbol, and DMRS subsampling is activated (e.g., such that one or more DMRS symbols are to be muted in the aggregated slot), the wireless communication device may determine that the PTRS will not be transmitted based at least in part on the first mapping value (e.g., since the PTRS will not be transmitted, and since the DMRS muting will prevent the DMRS from being used for phase noise compensation).

As another example, when the first mapping value L is equal to 4, there are 4 symbol periods from a first DMRS symbol to a second DMRS symbol, and DMRS subsampling is not activated (e.g., such that no DMRS symbols are to be muted in the aggregated slot), the wireless communication device may not determine that the PTRS will not be transmitted based at least in part on the first mapping value (e.g., when the DMRS can be used for phase noise compensation in place of the PTRS even though no PTRS may be transmitted). In such a case, the wireless communication device may not need to identify a second mapping value, and may transmit the PTRS based at least in part on the first mapping value.

Generally, the wireless communication device may determine that the PTRS will not be transmitted based at least in part on the first mapping value based at least in part on identifying a dynamic scenario. In addition to the dynamic scenarios described in the above examples (e.g., dynamic slot aggregation with or without DMRS subsampling), other such dynamic scenarios may include, but are not limited to, a scenario that uses dynamically allocated resources (e.g., in the frequency domain and/or the time domain) in association with a wireless communication, a scenario that uses non-slot based resource scheduling in association with a wireless communication, and/or the like.

As further shown in FIG. 3A, and by reference number 310, the wireless communication device may identify, based at least in part on determining that the PTRS will not be transmitted based at least in part on the first mapping value, a second mapping value associated with transmitting the PTRS.

In some aspects, the second mapping value is different from the first mapping value. For example, the second mapping value may be 2 (e.g., L=2), and the first mapping value may be 4 (e.g., L=4).

In some aspects, the wireless communication device may identify the second mapping value based at least in part on the second mapping value being configured on the wireless communication device via higher layer signaling (e.g., RRC signaling). In some aspects, the second mapping value may be semi-statically configured on the wireless communication device.

Additionally, or alternatively, the wireless communication device may identify the second mapping value based at least in part on a length of a slot, a number of symbols between symbols associated with a reference signal, and/or the like. For example, the wireless communication device may be configured with an algorithm that receives, as input, information that identifies a length of the aggregated slot, information that identifies a number of symbols from a first DMRS symbol to a second DMRS symbol, and/or the like, and provides, as output, the second mapping value. In this way, the wireless communication device may determine different mapping values in different scenarios.

Additionally, or alternatively, the wireless communication device may identify the second mapping value based at least in part on an association table configured on the wireless communication device. For example, the wireless communication device may be configured with a second set of association tables (e.g., a set of association tables to be used in a given dynamic scenario), and may identify the second mapping value based at least in part on the second set of association tables (e.g., using the MCS associated with the slot, the bandwidth associated with the slot, and/or the like).

In some aspects, the wireless communication device may be configured with a plurality of mapping values (in addition to the first mapping value) and may identify the second mapping value as one of the plurality of mapping values (e.g., based at least in part on the type of dynamic scenario, the length of the aggregated slot, the number of symbols from a first DMRS symbol to a second DMRS symbol, whether DMRS subsampling is activated, and/or the like).

As further shown in FIG. 3A, and by reference number 315, the wireless communication device may transmit the PTRS based at least in part on the second mapping value. FIG. 3B is an example illustrating transmission of the PTRS within one or more resources of a dynamically aggregated slot when DMRS subsampling is activated.

For the purposes of FIG. 3B, a dynamically aggregated slot (e.g., an aggregated slot created based at least in part on slot aggregation being dynamically enabled) includes two mini-slots, each with a length of 4 symbols (e.g., such that the aggregated slot has a length of 8 symbols). Further, the wireless communication device has determined, in the manner described above, that the wireless communication device is to transmit a PTRS based at least in part on a second mapping value of 2 (e.g., L=2) based at least in part on determining that the PTRS would not be transmitted based at least in part on a first mapping value of 4 (e.g., L=4).

Notably, in the example shown in FIG. 3B, use of the first mapping value (e.g., L=4) in association with transmitting the PTRS would have resulted in no PTRS being transmitted in the aggregated slot based at least in part on the set of PTRS mapping rules configured on the wireless communication device that the wireless communication device is not to transmit the PTRS in the DMRS symbol (e.g., regardless of whether the DMRS symbol is muted).

As shown in FIG. 3B, the wireless communication device may transmit the PTRS in symbol 2 and symbol 6. For example, the wireless communication device may determine (e.g., based at least in part on a set of PTRS mapping rules configured on the wireless communication device) that the wireless communication device is not to transmit the PTRS in the DMRS symbol (e.g., regardless of whether the DMRS symbol is muted). Thus, counting every second symbol from symbol 0 and while still considering the muted DMRS symbol as a DMRS symbol, the wireless communication device may determine that the PTRS is to be transmitted in symbol 2 and symbol 6, and may transmit the PTRS accordingly.

FIG. 3C is an example illustrating a case in which DMRS subsampling is not activated and the wireless communication device does not transmit the PTRS within the dynamically aggregated slot. As shown in FIG. 3C, with the first mapping value of 4 (e.g., L=4) and without DMRS subsampling activated (e.g., such that the second DMRS symbol is not muted, as shown in FIG. 3C), the wireless communication device may not transmit the PTRS based at least in part on the second mapping value of 2 (e.g., L=2) (e.g., when the DMRS can be used for phase compensation). Notably, in the example shown in FIG. 3C, use of the first mapping value (e.g., L=4) in association with transmitting the PTRS results in no PTRS being transmitted in the aggregated slot based at least in part on the set of PTRS mapping rules configured on the wireless communication device. However, since the DMRS is not muted (i.e., since DMRS subsampling is not activated) and the DMRS is transmitted in every fourth symbol, the wireless communication device need not transmit the PTRS using the second mapping value (e.g., when the DMRS can be used for phase compensation).

As indicated above, FIGS. 3A-3C are provided as examples. Other examples may differ from what is described with respect to FIGS. 3A-3C.

Figure 4:
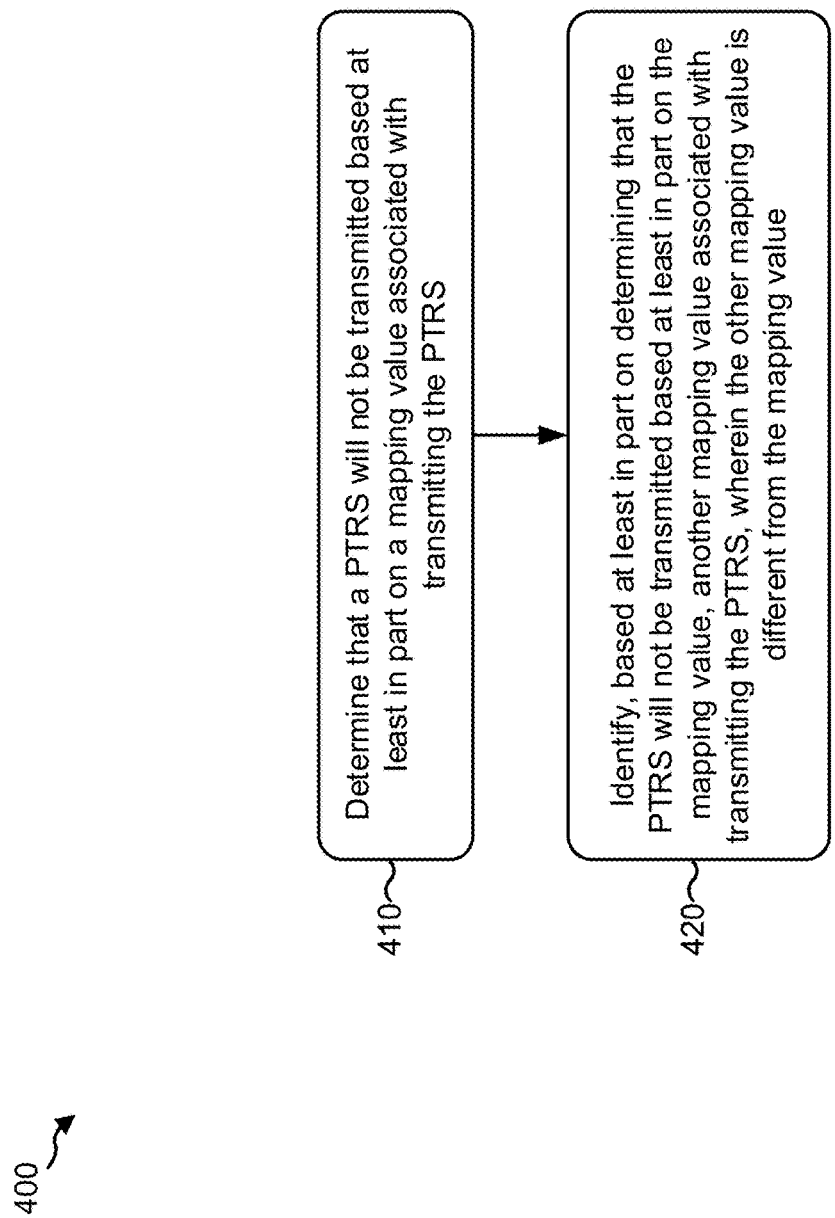
FIG. 4 is a diagram illustrating an example process performed, for example, by a wireless communication device, in accordance with various aspects of the present disclosure.

FIG. 4 is a diagram illustrating an example process 400 performed, for example, by a wireless communication device, in accordance with various aspects of the present disclosure. Example process 400 is an example where a wireless communication device (e.g., UE 120, base station 110, and/or the like) identifies a second mapping value, associated with transmitting a PTRS, based at least in part on determining that the PTRS will not be transmitted based at least in part on a first mapping value.

As shown in FIG. 4, in some aspects, process 400 may include determining that a PTRS will not be transmitted based at least in part on a mapping value associated with transmitting the PTRS (block 410). For example, the wireless communication device (e.g., controller/processor 240 of base station 110, transmit processor 220 of base station 110, controller/processor 280 of UE 120, transmit processor 264 of UE 120, and/or the like) may determine that a PTRS will not be transmitted based at least in part on a mapping value associated with transmitting the PTRS, as described above.

As further shown in FIG. 4, in some aspects, process 400 may include identifying, based at least in part on determining that the PTRS will not be transmitted based at least in part on the mapping value, another mapping value associated with transmitting the PTRS, wherein the other mapping value is different from the mapping value (block 420). For example, the wireless communication device (e.g., controller/processor 240 of base station 110, transmit processor 220 of base station 110, controller/processor 280 of UE 120, transmit processor 264 of UE 120, and/or the like) may identify, based at least in part on determining that the PTRS will not be transmitted based at least in part on the mapping value, another mapping value associated with transmitting the PTRS, wherein the other mapping value is different from the mapping value, as described above.

Process 400 may include additional aspects, such as any single aspect or any combination of aspects described below.

In some aspects, determining that the PTRS will not be transmitted based at least in part on the mapping value may include determining that a DMRS symbol is to be muted in a slot associated with a dynamic slot aggregation.

In some aspects, the PTRS may be transmitted based at least in part on the other mapping value. In some aspects, the other mapping value is one of a plurality of other mapping values configured on the wireless communication device. In some aspects, the mapping value is semi-statically configured on the wireless communication device.

In some aspects, the other mapping value is identified based at least in part on being configured on the wireless communication device by higher layer signaling. In some aspects, the other mapping value is identified based at least in part on a length of a slot or a number of symbols between symbols associated with a reference signal. In some aspects, the other mapping value is identified based at least in part on an association table configured on the wireless communication device.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5A:
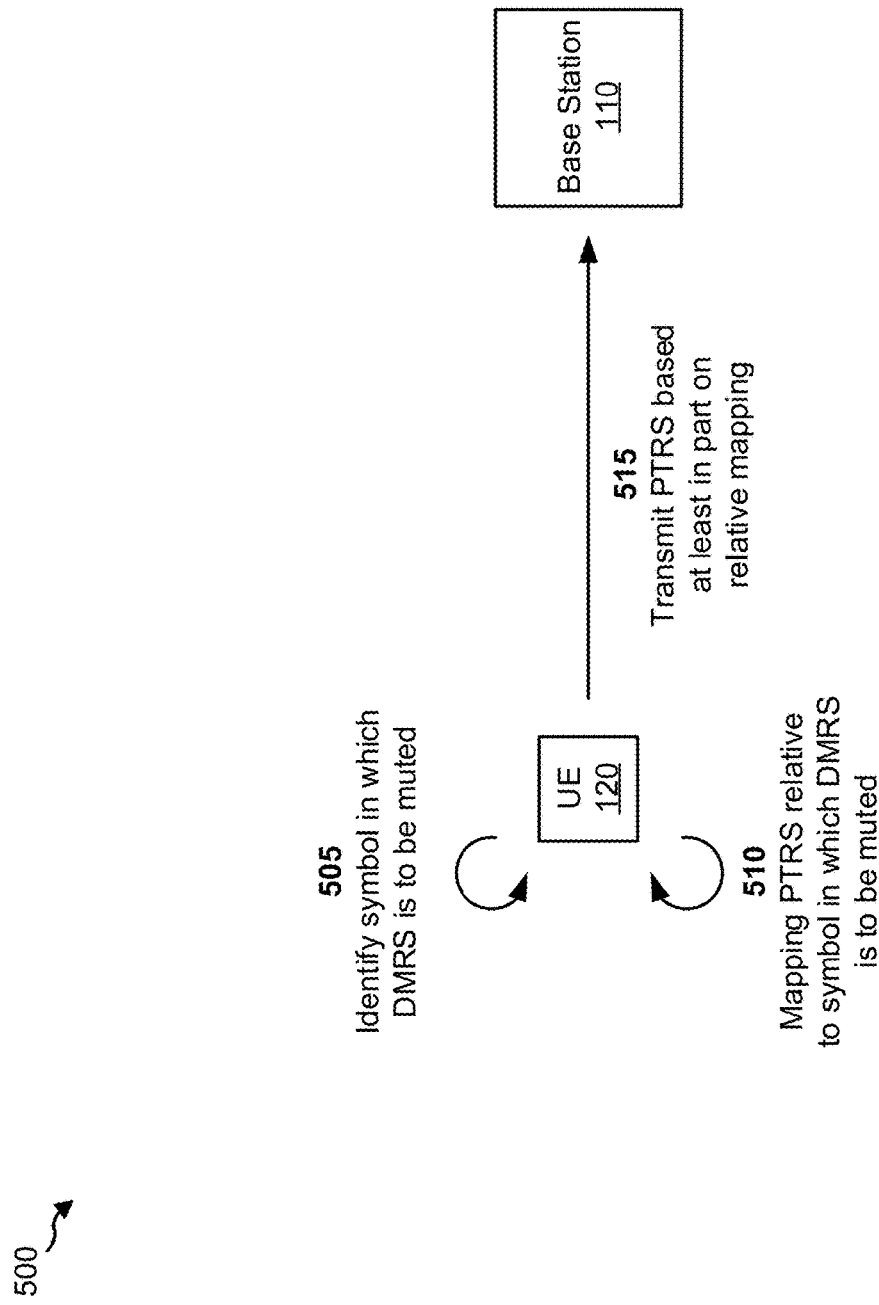
FIGS. 5A and 5B are diagrams illustrating an example of mapping, based at least in part on a mapping value configured on a wireless communication device, a PTRS relative to a symbol in which a DMRS is to be muted, in accordance with various aspects of the present disclosure.
Figure 5B:
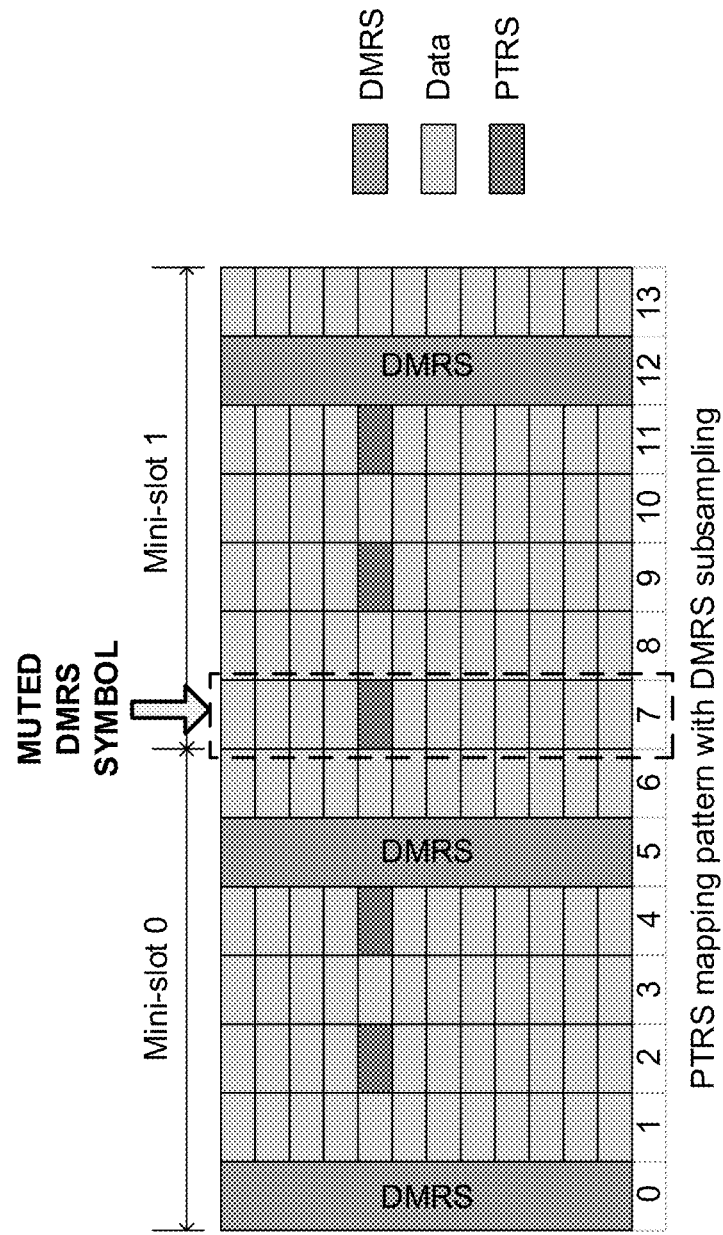

FIGS. 5A and 5B are diagrams illustrating an example 500 of mapping, based at least in part on a mapping value configured on a wireless communication device, a PTRS relative to a symbol in which a DMRS is to be muted, in accordance with various aspects of the present disclosure. Notably, while example operations associated with FIGS. 5A and 5B are illustrated as being performed by a UE 120, the example operations associated with FIGS. 5A and 5B can be performed by another type of wireless communication device that is to transmit a PTRS, such as a base station 110.

As shown in FIG. 5A, and by reference number 505, the wireless communication device may identify a symbol in which a DMRS is to be muted. For example, the wireless communication device may identify a symbol in which a DMRS symbol is to be muted in a dynamically aggregated slot (e.g., an aggregated slot created based at least in part on a dynamic slot aggregation), as described above. In some aspects, the wireless communication device may identify the symbol in which the DMRS is to be muted based at least in part on an indication that DMRS subsampling is activated in the aggregated slot. In some aspects, the wireless communication device may identify one or more symbols in which the DMRS symbol is to be muted.

As further shown in FIG. 5A, and by reference number 510, the wireless communication device may map, based at least in part on a mapping value configured on the wireless communication device, a PTRS relative to the symbol in which the DMRS is to be muted. For example, the wireless communication device may map the PTRS relative to the symbol in which the DMRS is to be muted based at least in part on a PTRS mapping rule and the mapping value (e.g., semi-statically) configured on the wireless communication device.

In some aspects, the wireless communication device may map the PTRS relative to the muted DMRS symbol such that the PTRS is mapped to the symbol in which the DMRS is to be muted. For example, the wireless communication device may be configured with a PTRS mapping rule indicating that the PTRS can be mapped to a muted DMRS symbol (i.e., a PTRS mapping rule that allows the PTRS to be transmitted in the muted mapping symbol). Thus, when mapping the DMRS based at least in part on the mapping value, the wireless communication device may map the PTRS to the muted DMRS symbol (e.g., when the mapping value results in the PTRS being mapped to the muted DMRS symbol). In other words, in some aspects, the muted DMRS symbol may be used for transmission of the PTRS. In some aspects, if the DMRS is dropped (i.e., not to be transmitted) for a reason other than DMRS subsampling (e.g., for preemption for URLLC traffic), then the wireless communication device may not map the PTRS to the DMRS symbol (e.g., in order to allow the DMRS symbol to be used for transmission of URLLC traffic).

In some aspects, the wireless communication device may map the PTRS relative to the muted DMRS symbol based at least in part on restarting a mapping pattern, associated with the mapping value, at the symbol in which the DMRS is to be muted. For example, the wireless communication device may be configured with a PTRS mapping rule indicating that the mapping pattern is to be restarted at the muted DMRS symbol, and the wireless communication device may map the PTRS based at least in part on restarting the mapping pattern at the muted DMRS symbol. Thus, in some aspects, the wireless communication device may map the PTRS to a symbol other than the symbol in which the DMRS is to be muted.

As further shown in FIG. 5A, and by reference number 515, the wireless communication device may transmit the PTRS based at least in part on mapping the PTRS relative to the symbol in which the DMRS is to be muted. FIG. 5B is an example illustrating transmission of the PTRS within one or more resources based at least in part on mapping relative to a muted DMRS symbol.

For the purposes of FIG. 5B, a dynamically aggregated slot (e.g., an aggregated slot created based at least in part on slot aggregation being dynamically enabled) includes two mini-slots, each with a length of 7 symbols (e.g., such that the aggregated slot has a length of 14 symbols). Further, the wireless communication device has identified symbol 7 as a symbol in which the DMRS is to be muted, and has mapped a PTRS based at least in part on a mapping value of 2 (e.g., L=2). Additionally, the wireless communication device is configured with a set of PTRS mapping rules indicating that the wireless communication device is permitted to map the PTRS to a muted DMRS symbol, is to start the mapping of the PTRS at a first data symbol of given mini-slot (e.g., a first PUSCH symbol, a first PDSCH symbol, and/or the like), and that a mapping pattern, associated with the PTRS mapping rule, is to be restarted at muted DMRS symbols (e.g., in addition to symbols that are to actually carry the DMRS).

As shown in FIG. 5B, the wireless communication device may transmit the PTRS in symbol 2, symbol 4, symbol 7, symbol 9, and symbol 11. For example, counting every second symbol from symbol 0, starting the mapping of the PTRS at the first data symbol of a given mini-slot (e.g., the muted DMRS symbol), and restarting the mapping pattern at each DMRS symbol, the wireless communication device may map the PTRS to symbol 2, symbol 4, symbol 7, symbol 9, and symbol 11. The wireless communication device may then transmit the PTRS accordingly.

As indicated above, FIGS. 5A and 5B are provided as examples. Other examples may differ from what is described with respect to FIGS. 5A and 5B.

Figure 6:
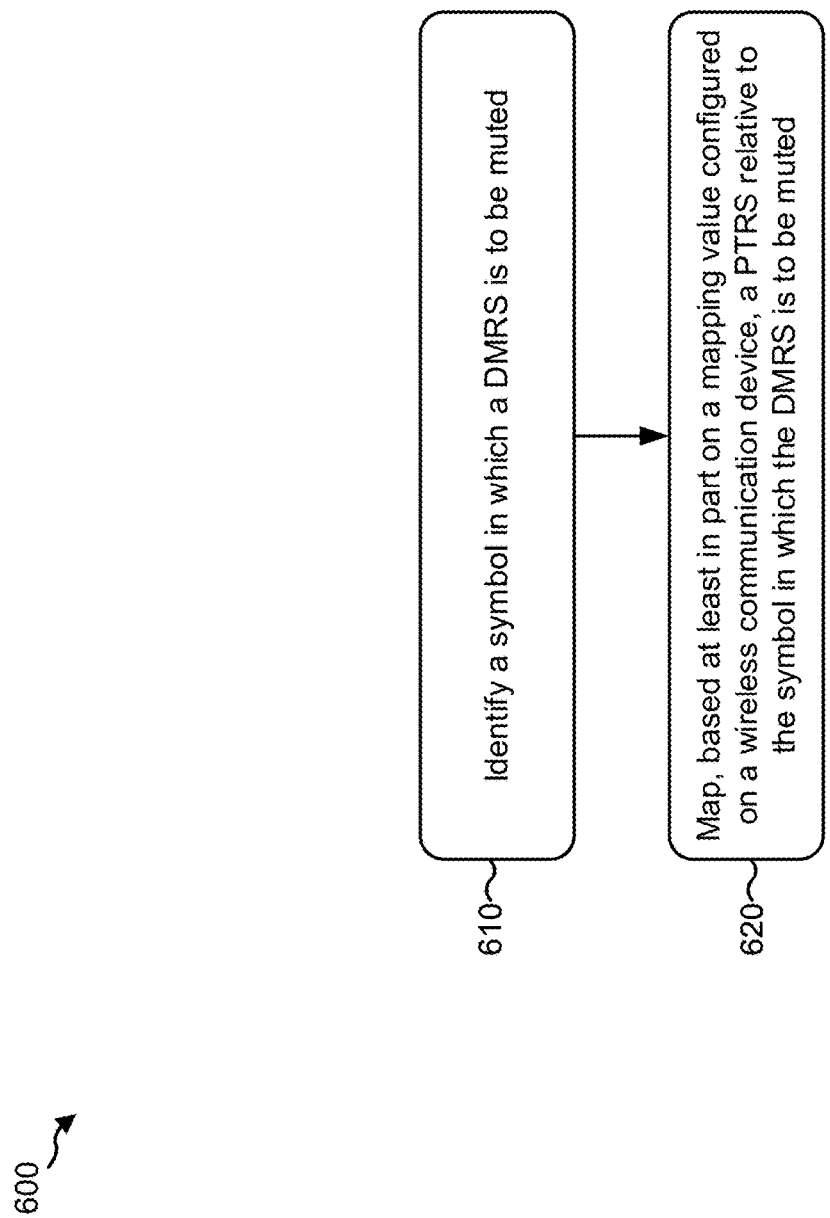
FIG. 6 is a diagram illustrating an example process performed, for example, by a wireless communication device, in accordance with various aspects of the present disclosure.

FIG. 6 is a diagram illustrating an example process 600 performed, for example, by a wireless communication device, in accordance with various aspects of the present disclosure. Example process 600 is an example where a wireless communication device (e.g., UE 120, base station 110, and/or the like) maps a PTRS relative to a symbol in which a DMRS is to be muted.

As shown in FIG. 6, in some aspects, process 600 may include identifying a symbol in which a DMRS is to be muted (block 610). For example, the wireless communication device (e.g., controller/processor 240 of base station 110, transmit processor 220 of base station 110, controller/processor 280 of UE 120, transmit processor 264 of UE 120, and/or the like) may identify a symbol in which a DMRS is to be muted, as described above.

As further shown in FIG. 6, in some aspects, process 600 may include mapping, based at least in part on a mapping value configured on the wireless communication device, a PTRS relative to the symbol in which the DMRS is to be muted (block 620). For example, the wireless communication device (e.g., controller/processor 240 of base station 110, transmit processor 220 of base station 110, controller/processor 280 of UE 120, transmit processor 264 of UE 120, and/or the like) may map, based at least in part on a mapping value configured on the wireless communication device, a PTRS relative to the symbol in which the DMRS is to be muted, as described above.

Process 600 may include additional aspects, such as any single aspect or any combination of aspects described below.

In some aspects, the PTRS is transmitted based at least in part on being mapped relative to the symbol in which the DMRS is to be muted.

In some aspects, the PTRS is mapped based at least in part on restarting a mapping pattern, associated with the mapping value, at the symbol in which the DMRS is to be muted.

In some aspects, the PTRS is mapped to the symbol in which the DMRS is to be muted. In some aspects, the DMRS is to be muted in association with DMRS subsampling. In some aspects, the PTRS is mapped to a symbol other than the symbol in which the DMRS is to be muted.

In some aspects, the mapping value is semi-statically configured on the wireless communication device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   determining that a phase-tracking reference signal (PTRS) will not be transmitted based at least in part on a mapping value associated with transmitting the PTRS meeting or exceeding a number of symbol periods from a first demodulation reference signal (DMRS) symbol to a second DMRS symbol, wherein determining that the PTRS will not be transmitted comprises determining that a DMRS symbol is to be muted in a slot associated with a dynamic slot aggregation; and
   identifying, based at least in part on determining that the PTRS will not be transmitted, another mapping value associated with transmitting the PTRS,
      wherein the other mapping value is different from the mapping value, and
      wherein the PTRS is transmitted based at least in part on the other mapping value.

2. The method of claim 1, wherein the other mapping value is one of a plurality of other mapping values configured on the wireless communication device.

3. The method of claim 1, wherein the mapping value is semi-statically configured on the wireless communication device.

4. The method of claim 1, wherein the other mapping value is identified based at least in part on being configured on the wireless communication device by higher layer signaling.

5. The method of claim 1, wherein the other mapping value is identified based at least in part on a length of a slot or a number of symbols between symbols associated with a reference signal.

6. The method of claim 1, wherein the other mapping value is identified based at least in part on an association table configured on the wireless communication device.

7. The method of claim 1, wherein the wireless communication device is a user equipment (UE).

8. The method of claim 1, wherein the first DMRS symbol and the second DMRS symbol are in an aggregated slot.

9. The method of claim 1, further comprising:
transmitting, based on the other mapping value, the PTRS to a base station.

10. A device for wireless communication, comprising:
memory; and
one or more processors coupled to the memory, wherein the one or more processors are configured to:
   determine that a phase-tracking reference signal (PTRS) will not be transmitted based at least in part on a mapping value associated with transmitting the PTRS meeting or exceeding a number of symbol periods from a first demodulation reference signal (DMRS) symbol to a second DMRS symbol, wherein to determine that the PTRS will not be transmitted, the one or more processors are configured to determine that a DMRS symbol is to be muted in a slot associated with a dynamic slot aggregation; and
   identify, based at least in part on the determination that the PTRS will not be transmitted, another mapping value associated with transmitting the PTRS,
      wherein the other mapping value is different from the mapping value, and
      wherein the PTRS is transmitted based at least in part on the other mapping value.

11. The device of claim 10, wherein the other mapping value is one of a plurality of other mapping values configured on the device.

12. The device of claim 10, wherein the mapping value is semi-statically configured on the device.

13. The device of claim 10, wherein the other mapping value is identified based at least in part on being configured on the device by higher layer signaling.

14. The device of claim 10, wherein the other mapping value is identified based at least in part on a length of a slot or a number of symbols between symbols associated with a reference signal.

15. The device of claim 10, wherein the other mapping value is identified based at least in part on an association table configured on the device.

16. The device of claim 10, wherein the device is a user equipment (UE).

17. The device of claim 10, wherein the first DMRS symbol and the second DMRS symbol are in an aggregated slot.

18. The device of claim 10, wherein the one or more processors are further configured to:
transmit, based on the other mapping value, the PTRS to a base station.

19. A non-transitory computer-readable medium comprising one or more instructions stored thereon that, when executed by a device, cause the device to:
   determine that a phase-tracking reference signal (PTRS) will not be transmitted based at least in part on a mapping value associated with transmitting the PTRS meeting or exceeding a number of symbol periods from a first demodulation reference signal (DMRS) symbol to a second DMRS symbol, wherein the one or more instructions, that cause the device to determine that the PTRS will not be transmitted, cause the device to determine that a DMRS symbol is to be muted in a slot associated with a dynamic slot aggregation; and
   identify, based at least in part on the determination that the PTRS will not be transmitted, another mapping value associated with transmitting the PTRS,
      wherein the other mapping value is different from the mapping value, and
      wherein the PTRS is transmitted based at least in part on the other mapping value.

20. The non-transitory computer-readable medium of claim 19, wherein the other mapping value is one of a plurality of other mapping values configured on the device.

21. The non-transitory computer-readable medium of claim 19, wherein the mapping value is semi-statically configured on the device.

22. The non-transitory computer-readable medium of claim 19, wherein the other mapping value is identified based at least in part on being configured on the device by higher layer signaling.

23. The non-transitory computer-readable medium of claim 19, wherein the other mapping value is identified based at least in part on a length of a slot or a number of symbols between symbols associated with a reference signal.

24. The non-transitory computer-readable medium of claim 19, wherein the other mapping value is identified based at least in part on an association table configured on the device.

25. The non-transitory computer-readable medium of claim 19, wherein the device is a user equipment (UE).

26. The non-transitory computer-readable medium of claim 19, wherein the first DMRS symbol and the second DMRS symbol are in an aggregated slot.

27. The non-transitory computer-readable medium of claim 19, wherein the one or more instructions further cause the device to:
transmit, based on the other mapping value, the PTRS to a base station.

28. An apparatus comprising:
means for determining that a phase-tracking reference signal (PTRS) will not be transmitted based at least in part on a mapping value associated with transmitting the PTRS meeting or exceeding a number of symbol periods from a first demodulation reference signal (DMRS) symbol to a second DMRS symbol,
   wherein the means for determining that the PTRS will not be transmitted comprises means for determining that a DMRS symbol is to be muted in a slot associated with a dynamic slot aggregation; and
means for identifying, based at least in part on determining that the PTRS will not be transmitted, another mapping value associated with transmitting the PTRS,
   wherein the other mapping value is different from the mapping value, and
   wherein the PTRS is transmitted based at least in part on the other mapping value.

29. The apparatus of claim 28, wherein the other mapping value is one of a plurality of other mapping values configured on the apparatus.

30. The apparatus of claim 28, wherein the mapping value is semi-statically configured on the apparatus.

31. The apparatus of claim 28, wherein the other mapping value is identified based at least in part on being configured on the apparatus by higher layer signaling.

* * * * *